(12) United States Patent
Pan et al.

(10) Patent No.: US 7,768,554 B2
(45) Date of Patent: Aug. 3, 2010

(54) ELECTRONIC DEVICE WITH SIMPLIFIED OPERATION INPUT/OUTPUT MODULE

(75) Inventors: Pung-Yu Pan, Tu-Cheng (TW);
Kang-Shun Hsu, Tu-Cheng (TW);
Shun-Ling Kao, Tu-Cheng (TW);
Hsiang-En Peng, Tu-Cheng (TW);
Yu-Tsung Su, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 421 days.

(21) Appl. No.: 11/978,079

(22) Filed: Oct. 26, 2007

(65) Prior Publication Data
US 2008/0240620 A1 Oct. 2, 2008

(30) Foreign Application Priority Data
Mar. 29, 2007 (CN) .................... 2007 1 0200349

(51) Int. Cl.
*H04N 5/228* (2006.01)
(52) U.S. Cl. .................................. 348/222.1
(58) Field of Classification Search ............... 348/222.1
See application file for complete search history.

(56) References Cited
U.S. PATENT DOCUMENTS

| 6,081,669 | A | | 6/2000 | Kosako | |
|---|---|---|---|---|---|
| 6,167,469 | A | * | 12/2000 | Safai et al. | 710/62 |
| 6,317,141 | B1 | * | 11/2001 | Pavley et al. | 715/732 |
| 6,538,663 | B2 | * | 3/2003 | Kamei | 345/635 |
| 7,432,940 | B2 | * | 10/2008 | Brook et al. | 345/629 |
| 2003/0146915 | A1 | * | 8/2003 | Brook et al. | 345/473 |
| 2005/0097475 | A1 | * | 5/2005 | Makioka et al. | 715/792 |
| 2005/0212817 | A1 | * | 9/2005 | Cannon et al. | 345/619 |
| 2006/0170669 | A1 | * | 8/2006 | Walker et al. | 345/418 |
| 2007/0041029 | A1 | * | 2/2007 | Yoo | 358/1.13 |
| 2008/0239133 | A1 | * | 10/2008 | Cazier et al. | 348/333.05 |

FOREIGN PATENT DOCUMENTS

| CN | 1713687 A | 12/2005 |
|---|---|---|
| EP | 1746815 A2 | 1/2007 |
| JP | 2005-303728 A | 10/2005 |

* cited by examiner

*Primary Examiner*—James M Hannett
(74) *Attorney, Agent, or Firm*—Jeffrey T. Knapp

(57) ABSTRACT

An electronic device includes an imaging unit configured for capturing an image of a subject, a memory unit configured for storing data and images; a processing unit configured for processing data and images; a display unit configured for displaying data and images; and a central processing unit configured for processing various signals and images. The processing unit includes a replay module, a selection module, a function module, a menu module and an input/output unit. The input/output unit is configured for activating anyone of the replay module, the selection module, the function module and the menu module. The application system for the electronic device through activating each module via the input/output interface unit can allow the use of the electronic device to be more convenient and simplified.

14 Claims, 5 Drawing Sheets

ELECTRONIC DEVICE WITH SIMPLIFIED OPERATION INPUT/OUTPUT MODULE

TECHNICAL FIELD

The present invention relates generally to electronic devices, and more particularly, to an electronic device having a simplified input/output module.

BACKGROUND

Electronic devices, such as digital cameras, typically come equipped with features and functionalities that are designed to satisfy a range of users, from novice to professional. Generally as is well known, these various features are selected, activated or changed using a menu selection item as presented in a menu embedded in the electronic devices. The user accesses the menu via a graphical user interface (GUI) to select the various features or options available on the electronic devices. However, these menus and GUIs are generally too complicated or difficult to thereby prevent the user from efficiently operating the electronic device.

With the increasing complexity of features on electronic devices, such as digital camera, computer, television, automated teller machines, electronic game consoles, personal digital assistant (PDA) and so on, the number of menu items for the user interface consoles have correspondingly increased, thereby further complicating the menu system. This leads to an increase in user anxiety and, therefore, serves as a barrier to market adoption. Additionally, the task of navigating through the menu is complicated by the typical smaller-sized screens of electronic devices. Electronic device manufacturers have attempted to resolve these problems by pre-activating or pre-setting a fixed set of features (i.e., factory or default setting), so that the user can operate the electronic devices without accessing the on-board menu system. However, this solution does not account for the varying skill levels and interests of the users, and defeats the purpose of offering these various features and functions in electronic devices. One of the reasons for offering these various features or functionalities is to enable the user to operate the electronic devices in a manner fitting his or her needs.

SUMMARY

In a preferred embodiment, an electronic device includes an imaging unit configured (i.e., structured and arranged) for capturing images, a memory unit configured for storing data and the images, a processing unit configured for processing the data and the images, a display unit configured for displaying the data and the images and a central processing unit configured for processing the data and signals. The processing unit includes a replay module, a selection module, a function module, a menu module and an input/output unit. The replay module is configured for replaying the images stored in the memory unit. The selection module is configured for selectively setting the functions of the electronic device. The function module is configured for setting the imaging parameters of the electronic device. The menu module is configured for setting the system functions of the electronic device. The input/output unit is configured for activating any one of the replay module, the selection module, the function module and the menu module.

BRIEF DESCRIPTION OF THE DRAWINGS

Many aspects of an electronic device can be better understood with reference to the following drawings. The components in the drawing are not necessarily drawn to scale, the emphasis instead being placed upon clearly illustrating the principles of the present electronic device. Moreover, in the drawings, like reference numerals designate corresponding parts throughout the several views.

DETAILED DESCRIPTION OF THE PREFERRED EMBODIMENTS

Figure 1:
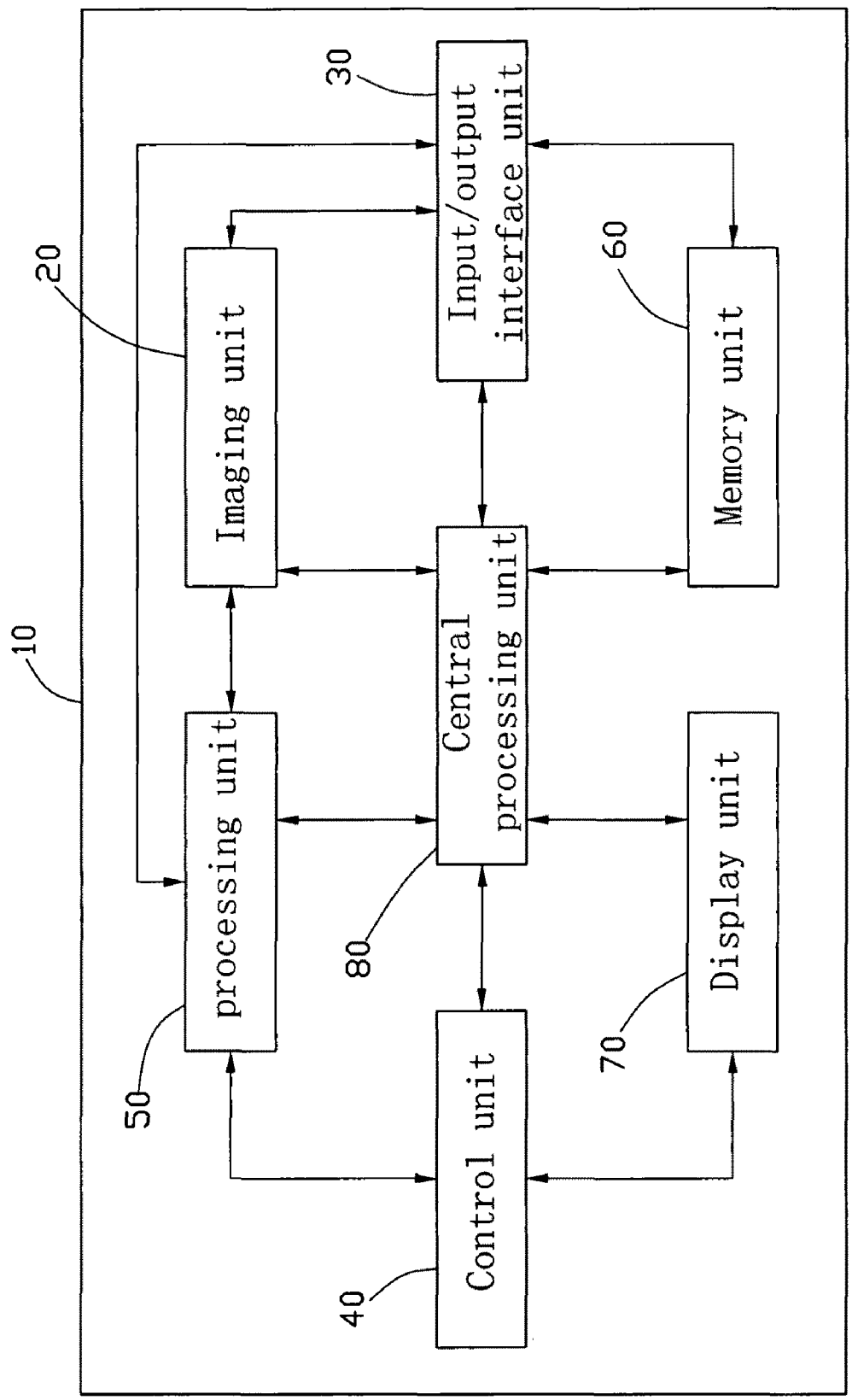
FIG. 1 is a block diagram of an electronic device in accordance with an embodiment of the present invention.

The detailed explanation of an electronic device according to the present invention will now be made with reference to the drawings attached hereto. FIG. 1 illustrates an embodiment of the present invention. There is an electronic device such as a digital camera, personal digital assistant (PDA), video recorder, television, mobile telephone, telephone, telephone answering system, fax machine, and the like. In the present embodiment of the present invention, the electronic device is a digital camera 10.

Figure 2:
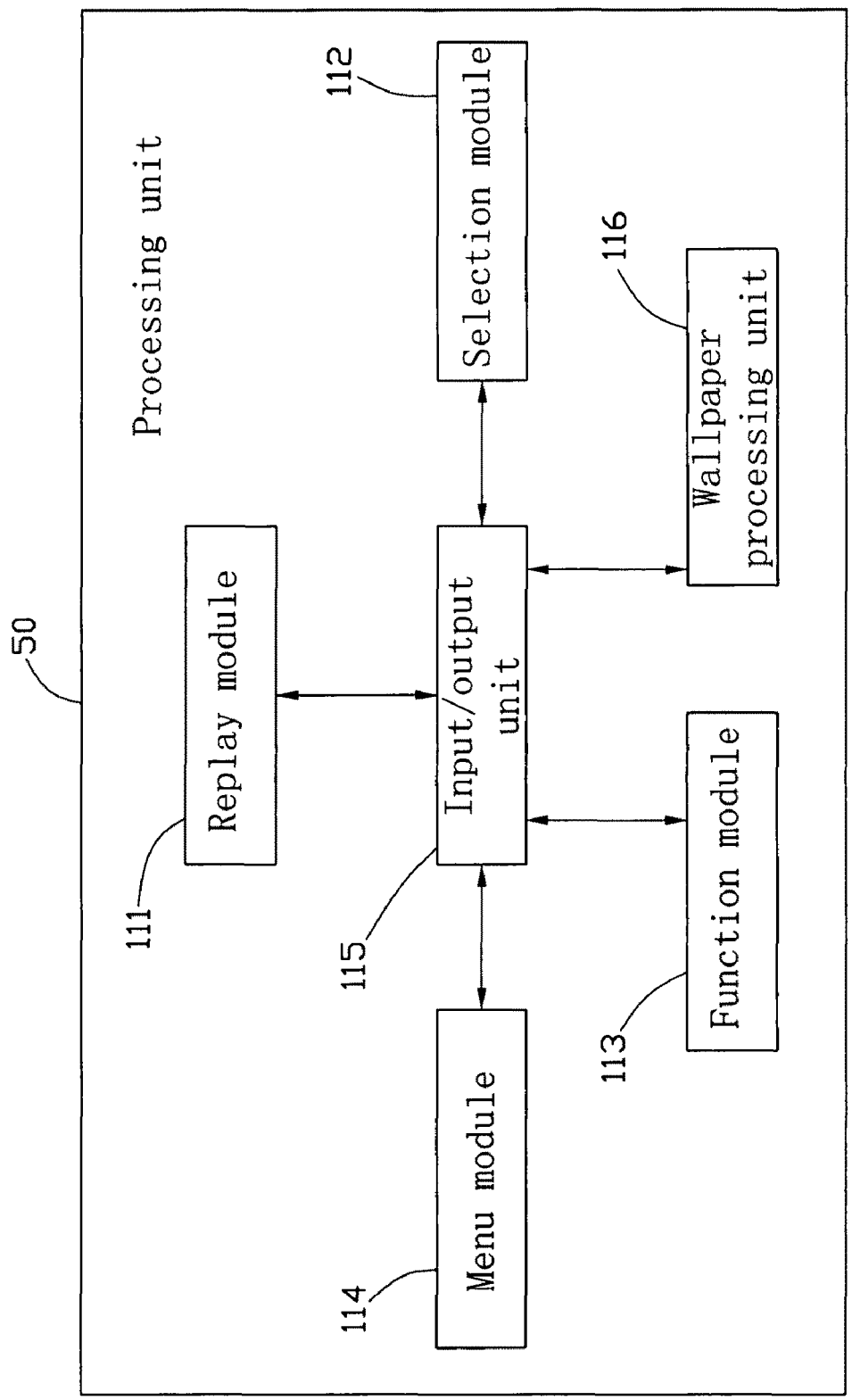
FIG. 2 is a block diagram of a processing unit of the electronic device shown in FIG. 1.

Referring to FIGS. 1 and 2, the digital camera 10 includes an imaging unit 20, an input/output interface unit 30, a processing unit 50, a memory unit 60, a display unit 70, a control unit 40 and a central processing unit 80 (CPU).

The imaging unit 20 of the digital camera 10 is electronically connected to the CPU 80 and the memory unit 60 and configured for transferring the images to the memory unit 60 via the CPU 80. The imaging unit 20 can be an image sensor module, a lens module, and the like. In the present embodiment, the imaging unit 20 is a lens module.

The input/output interface unit 30, which is electronically connected to the imaging unit 20, the CPU 80 and the processing unit 50, is configured for interfacing with the user and for receiving and transmitting instructions. The input/output interface 30 can be a keyboard, touch pad, buttons, or the like. In the present embodiment, the input/output interface unit 30 is in the form of a number of buttons.

The memory unit 60 can be a BIOS (Basic Input/Output System) chip, which is electronically connected to the CPU 80 and the input/output interface unit 30, is configured for storing the images captured by the imaging unit 20 and various data, such as music, installation software and uninstall programs.

The display unit 70 is electronically connected to the CPU 80 and the control unit 40. The display unit 70 can display the images captured by the image unit 20 under the control of the CPU 80 and the control unit 40. The display unit 70 can be a liquid crystal display (LCD) monitor (not shown) used for displaying the images to the user.

The control unit 40 is electronically connected to the CPU 80, the display unit 70 and the processing unit 50 and is configured for cooperating with the CPU 80 and controlling the operations of the processing unit 50 and the display unit 70.

The processing unit 50 is electronically connected to the CPU 80, the imaging unit 20, the control unit 40 and the input/output interface unit 30. The processing unit 50 is configured for processing the images, test, and data stored in the memory unit 60, and transferring the processed images, text, and data into either the control unit 40 or the display unit 70 via the CPU 80.

The CPU 80 is electrically connected to the imaging unit 20, the input/output interface unit 30, the memory unit 60, the display unit 70, the control unit 40 and the processing unit 50, respectively. The CPU 80 is configured for processing the signals and data coming from the imaging unit 20, the input/output interface unit 30, the control unit 40, the memory unit 60, the display unit 70 and the processing unit 50. At the same time, the CPU 80 enables the transmission of processed signals and the images between the CPU 80 and the input/output interface unit 30, the control unit 40, the memory unit 60, the display unit 70, the processing unit 50. The imaging unit 20 exchanges signals and the images with the processing unit 80 via the input/output interface unit 30 providing instructions.

Figure 4:
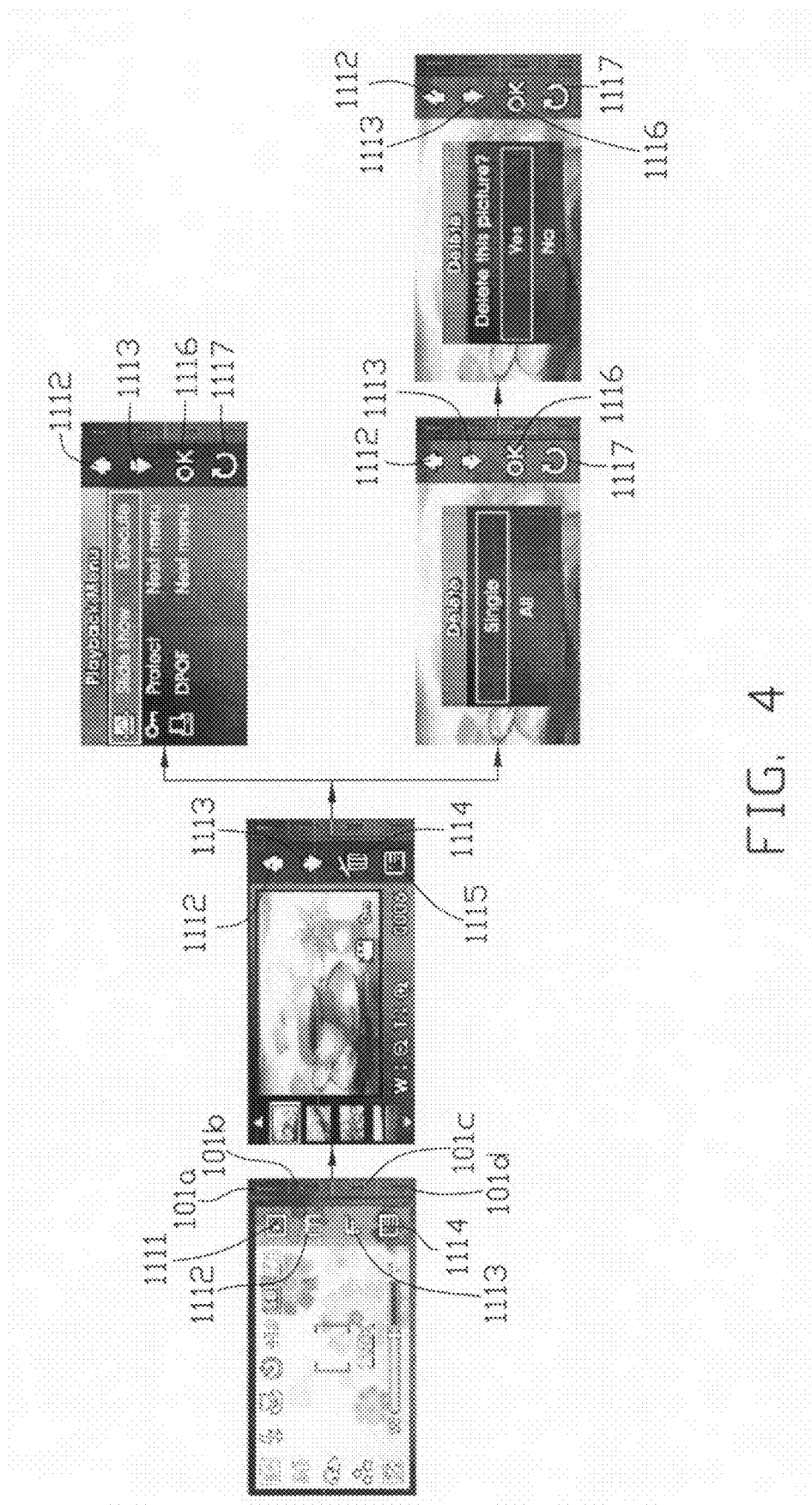
FIG. 4 is a plurality of schematic views illustrating the process flow for the user interface of the electronic device of FIG. 2.

Referring to FIGS. 2 and 4, the processing unit 50 includes a replay module 111, a selection module 112, a function module 113, a menu module 114, and an input/output unit 115. The replay module 111 is configured for replaying the images stored in the memory unit 60. The selection module 112 is configured for selectively setting the functions of the digital camera 10. The function module 113 is configured for setting the imaging parameters of the digital camera 10. The menu module 114 is configured for setting the system functions of the digital camera 10. The input/output unit 115 is configured for activating anyone of the replay module 111, the selection module 112, the function module 113 and the menu module 114.

The processing unit 50 can further include a wallpaper processing unit 116. When the current image is retained for a pre-determined time, such as ten seconds, fifteen seconds, etc., after the operations of the processing unit 50 have finished, the wallpaper processing unit 116 generates a record file and records or stores the current image and makes the current image display fully on the display unit 70 until a certain predetermined event has occurred. The certain predetermined event may include, but is not limited to, the operating of the digital camera 10 again or the running of the application of the digital camera 10 again.

The selection module 112 includes a plurality of items such as camera module, scene module, photo booth module (known commonly as "Purikura"), album module, video broadcast module, game module and setting module.

The photo tooth module is configured for making pictures stored in the memory unit 60 as a background of the captured image.

The menu module 114 is configured for, but is not limited to, setting the size of the image, printing quality of the image, color and white balance, color temperature, and so on.

The input/output unit 115 is electrically and respectively connected to the replay module 111, the selection module 112, the function module 113, the menu module 114 and the wallpaper processing unit 116 to exchange data and images. The input/output unit 115 includes at least a main virtual button and a number of subsidiary virtual buttons respectively appended to the main virtual button. In the present embodiment, the input/output unit 115 includes four main virtual buttons and four subsidiary virtual buttons respectively corresponding to the four main virtual buttons. The main virtual buttons 1111, 1121, 1131 and 1141 are respectively corresponded to the replay module 111, the selection module 112, the function module 113 and the menu module 114.

Figure 3:
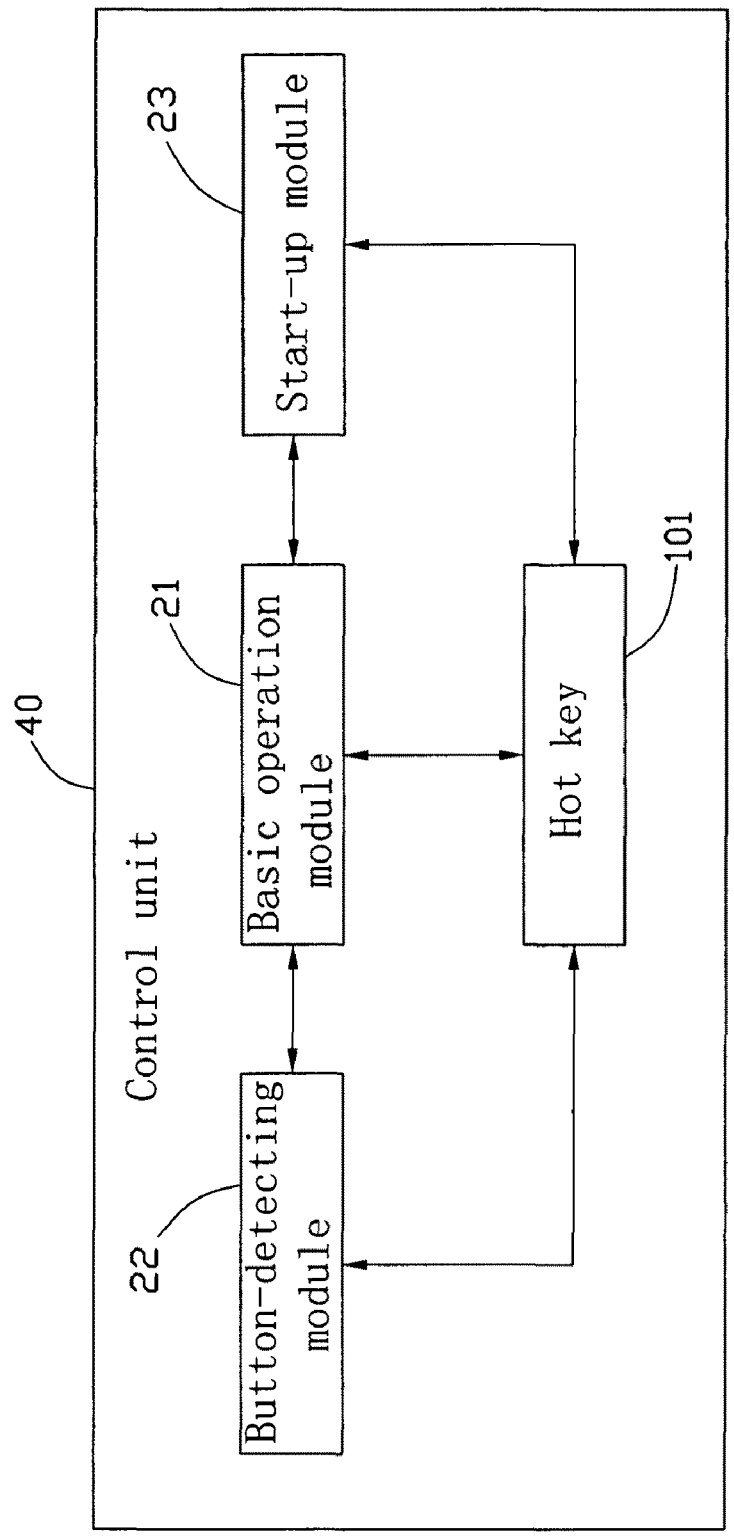
FIG. 3 is a block diagram of a control unit of the electronic device shown in FIG. 1.

Referring to FIG. 3, the control unit 40 is configured for cooperating with the CPU 80 and controlling the run of each module of the processing unit 50. The control unit 40 includes a basic operation module 21, a hot key 101, a button-detecting module 22, and a start-up module 23. The hot key 101 is electronically connected to the basic operation module 21. The button-detecting module 22 is electronically connected to the basic operation module 21 and the hot key 101. The start-up module 23 is electronically connected to the basic operation module 21 and the hot key 101.

The basic operation module 21 is pre-stored in the memory unit 60 of the digital camera 10. The basic operation module 21 provides an operation environment and firmware to take the pre-installed media record stored in the storage devices in the forms such as hard disk drives, optical discs, memory devices, or the like, of the digital camera 10 to control and operate each module of the processing unit 50.

The hot key 101 can be a hardware element for activating the application system. The hot key 101 can be, but is not limited to, a button, key or other input devices. In the present embodiment, the hot key 101 includes buttons 101a, 101b, 101c, and 101d. The buttons 101a, 101b, 101c, and 101d can respectively activate a designated function of the digital camera 10, such as capturing images, system setup, or entertainment, and the like.

The button-detecting module 22 is pre-stored in the control unit 40 of the digital camera 10, and the button-detecting module 22 is carried out after the digital camera 10 is turned on. The button-detecting module 22 is configured for carrying out the instructions corresponding to the buttons 101a, 101b, 101c, and 101d.

The start-up module 23 is stored in the control unit 40 of the digital camera 10 and is configured for starting the application system when the hot key 101 is activated. At this time, the digital camera is under an active state, and can utilize the various functionalities and modules for operating the digital camera so as to accomplish various setup and image capture.

Figure 5:
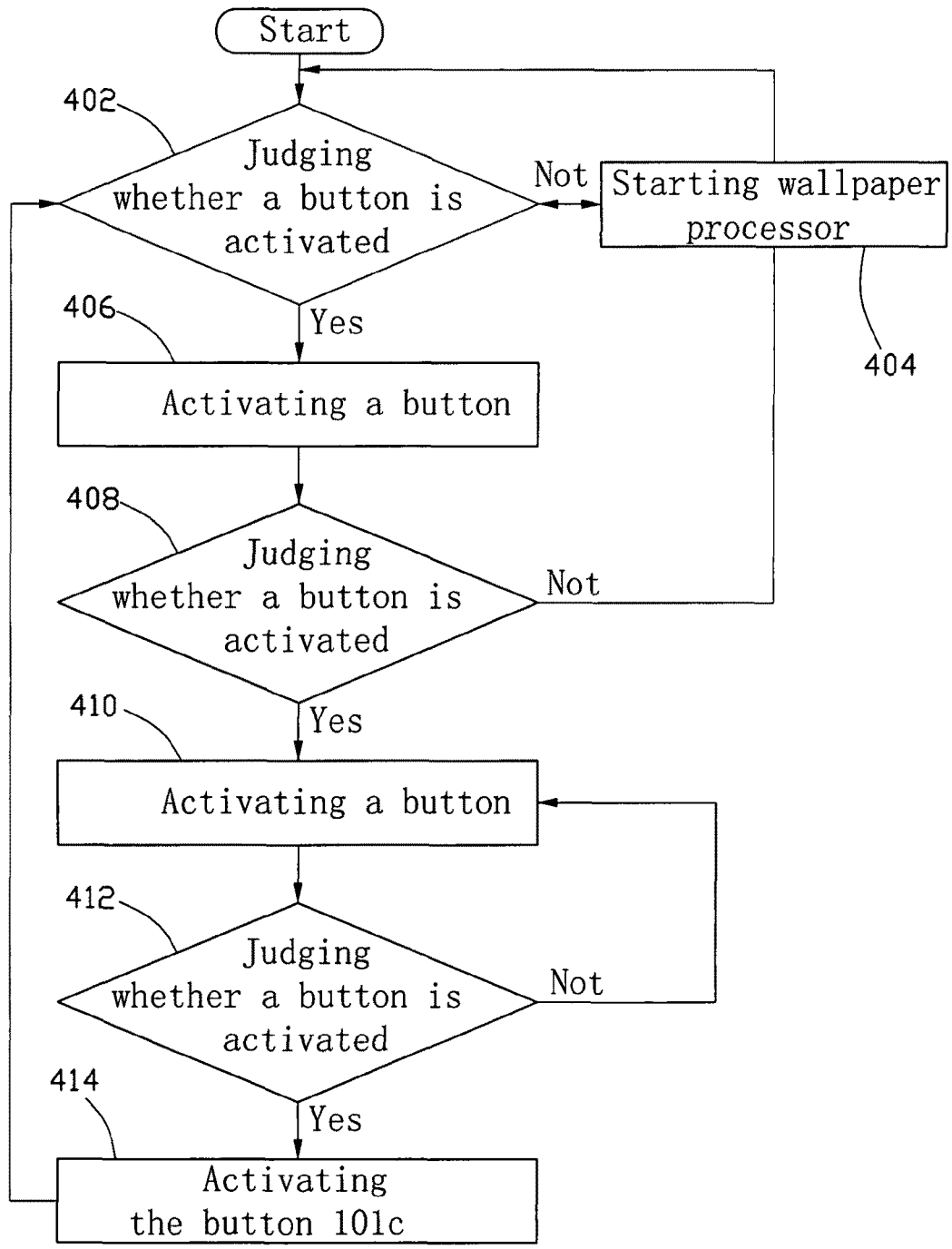
FIG. 5 is a flow chart illustrating the operation of the electronic device using the processing unit of FIG. 2.

Referring to FIG. 4 and FIG. 5, the operation procedure of the user interface of the application system of the digital camera 10 of the present embodiment is shown.

The method of operation of the replay module 111 is basically similar to that of the selection module 112, the function module 113, and the menu module 114. In the present embodiment, the replay module 111 is being used as an example for explaining the method of operating the replay module 111. The method of operation of the replay module 111 includes the steps of:

In step 402, it is judged whether a button is activated after the digital camera 10 is turned on. In the present embodiment, the CPU 80 is used to judge whether any one of the buttons 101a, 101b, 101c, and 101d is activated using the button-detecting module 22.

In step 404, the wallpaper processing unit 116 is activated. If none of the buttons 101a, 101b, 101c, and 101d is activated, the CPU 80 starts the wallpaper processing unit 116 after the operations of the processing unit 50 have finished and remains idle for a pre-determined time, and the current image is to display fully on the display unit 70 until a certain predetermined event has occurred.

In step 406, a button is activated. If one of the buttons 101a, 101b, 101c, and 101d is activated, the CPU 80 starts a module which is corresponding to the particular activated button of the buttons 101a, 101b, 101c, and 101d via the button-detecting module 22. Each of the buttons 101a, 101b, 101c, and 101d is respectively configured for activating the replay module 111, the selection module 112, the function module 113 and the menu module 114, respectively, corresponding to each of the main virtual buttons 1111, 1121, 1131, and 1141 of the input/output unit 115, respectively. For example, when the button 101a is activated, the replay module 111 is also activated in present embodiment.

After the replay module 111 is activated, the CPU 80 starts the four subsidiary virtual buttons. The buttons 101a, 101b, 101c and 101d then respectively correspond to a scroll up virtual button 1112, a scroll down virtual button 1113, a delete virtual button 1114 and a back virtual button 1115 in the present embodiment. All of the functions of the replay module 111 can be realized by activating the buttons 101a, 101b, 101c, and 101d.

In step 408, it is judged whether a button is activated. The CPU 80 judges whether one of the buttons 101a, 101b, 101c, and 101d is activated. If one of the buttons 101a, 101b, 101c, and 101d is activated, the CPU 80 starts the button-detecting module 22. If none of buttons 101a, 101b, 101c, and 101d is activated, the CPU 80 starts the wallpaper processing unit 116 and go back to step 404; after the operations of the processing unit 50 have finished and remains idle for a pre-determined time, the current image is to display fully on the display unit 70 unit a certain predetermined event has occurred.

In step 410, a button is activated. In the present embodiment, the button 101c is activated. After the button 101c is activated, the CPU 80 starts the button-detecting module 22 and activates a delete function module corresponding to the button 101c. Here, the CPU 80 starts the subsidiary virtual buttons including an enter virtual button 1116 and a back virtual button 1117 and each of the buttons 101a, 101b, 101c, and 101d corresponds to the scroll up virtual button 1112, the scroll down virtual button 1113, the enter virtual button 1116 and the back virtual button 1117.

In step 412, it is judged whether a button is activated. The CPU 80 is used to judge whether one of the buttons 101a, 101b, 101c and 101d is activated. If one of the buttons is activated, the CPU 80 starts the button-detecting module 22. However, if none of the buttons is activated, the CPU 80 activates the wallpaper processing unit 116.

In the present embodiment, the method for operating the buttons 101a, 101b, and 101d is basically similar to that of the button 101c, so the following detailed explanation of the button 101c, being used as an example, is made with reference to FIG. 5.

In step 414, if the button 101c is activated, the deleting application is launched and the current image is deleted using the deleting application. Because the button 101c is configured for operating the enter virtual button 1116, after the button 101c is activated, the CPU 80 starts the button-detecting module 22 and the deleting application and deletes the current image using the deleting application.

When it is decided to delete the current image, after the current image is deleted, the CPU 80 restarts the replay module 111.

Of course, it can be appreciated that the method of operating the replay module 111 can further comprise the step of judging whether all of the current images or one of them is deleted.

The digital camera can flexibly, conveniently, and expediently be used using the buttons and the main virtual buttons, and the subsidiary virtual buttons of the input/output unit 115 in conjunction with using the hot key such as the buttons 101a, 101b, 101c and 101d. Of course, the digital camera can include more buttons than those mentioned above in order to realize additional functions.

It can be understood that the above-described embodiment are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. An electronic device comprising:
    an imaging unit configured for capturing images of a subject;
    a memory unit configured for storing data and the images acquired by the imaging unit;
    a display unit configured for displaying the data and the images;
    a central processing unit coupled to the imaging unit, the memory unit, and the display unit and configured for processing the data and signals;
    a processing unit configured for processing the data and the images, comprising:
        a replay module configured for replaying the images stored in the memory unit;
        a selection module configured for selectively setting a plurality of functions of the electronic device;
        a function module configured for setting the imaging parameters of the electronic device;
        a menu module configured for setting the system functions of the electronic device; and
        an input/output unit configured for activating the replay module, the selection module, the function module or the menu module; and
    a wallpaper processing unit configured for making a current image display fully on the display unit after the operation of the processing unit has finished and remaining idle for a pre-determined time after the operation of the processing unit has finished.

2. The electronic device as claimed in claim 1, wherein the imaging unit is an image sensor module.

3. The electronic device as claimed in claim 1, wherein the imaging unit is a lens module.

4. The electronic device as claimed in claim 1, further comprising an input/output interface unit which comprises a hot key configured for activating a function of the electronic device.

5. The electronic device as claimed in claim 4, wherein the hot key is a button.

6. The electronic device as claimed in claim 4, further comprising a button-detecting module configured for carrying out operations corresponding to the hot key.

7. The electronic device as claimed in claim 4, wherein the hot key is a touchpad.

8. The electronic device as claimed in claim 1, wherein the display unit is a liquid crystal display monitor.

9. The electronic device as claimed in claim 1, wherein the selection module comprises a camera module, a scene module, a photo booth module, an album module, a video broadcast module, a game module and a settings module.

10. The electronic device as claimed in claim 9, wherein the photo booth module is configured for making pictures stored in the memory unit as a background for the captured image.

11. The electronic device as claimed in claim 1, wherein the menu module is configured for setting the size of the image, printing quality of the image, color and white balance, and color temperature.

12. The electronic device as claimed in claim 1, wherein the input/output unit comprises at least a main virtual button and a plurality of subsidiary virtual buttons appended to the main virtual button, respectively.

13. The electronic device as claimed in claim 12, wherein the input/output unit comprises four main virtual buttons.

14. The electronic device as claimed in claim 12, wherein the input/output unit comprises four subsidiary virtual buttons.

* * * * *

UNITED STATES PATENT AND TRADEMARK OFFICE
CERTIFICATE OF CORRECTION

PATENT NO. : 7,768,554 B2
APPLICATION NO. : 11/978079
DATED : August 3, 2010
INVENTOR(S) : Pung-Yu Pan et al.

Page 1 of 1

It is certified that error appears in the above-identified patent and that said Letters Patent is hereby corrected as shown below:

On the title page, item [75] should read:

(75) Peng-Yu PAN, Tu-Cheng (TW);
Kang-Shun HSU, Tu-Cheng (TW);
Shun-Ling KAO, Tu-Cheng (TW);
Hsiang-En PENG, Tu-Cheng (TW);
Yu-Tsung SU, Tu-Cheng (TW)

Signed and Sealed this
Fourth Day of January, 2011

David J. Kappos
*Director of the United States Patent and Trademark Office*